June 7, 1949. T. B. KIMBALL 2,472,537
HYDROCARBON CONVERSION WITH FLUIDIZED CATALYST
Filed April 19, 1947
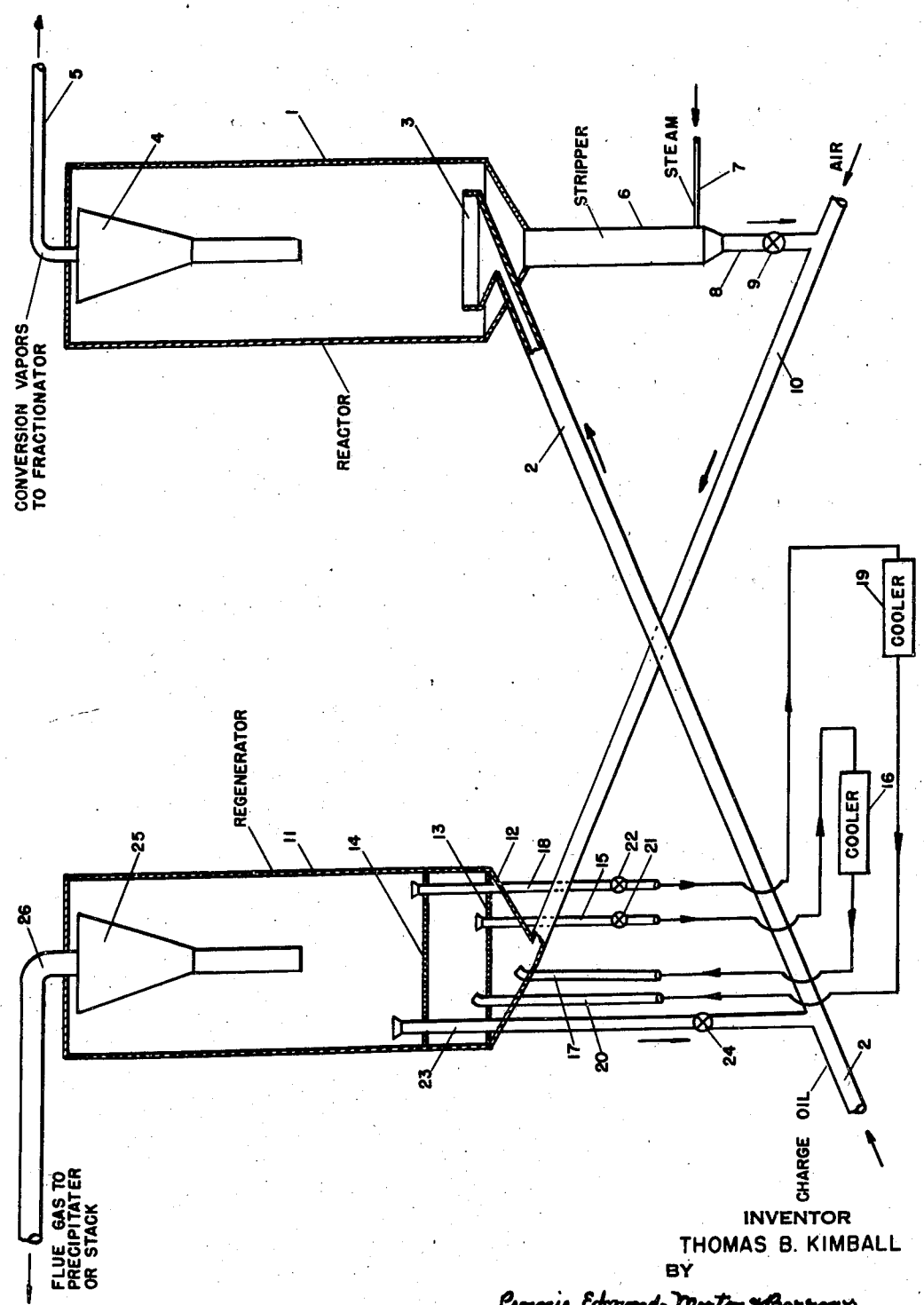
INVENTOR
THOMAS B. KIMBALL
BY
Pennie, Edmonds, Morton & Barrows
ATTORNEYS Patented June 7, 1949

2,472,537

UNITED STATES PATENT OFFICE 2,472,537

HYDROCARBON CONVERSION WITH FLUIDIZED CATALYST

Thomas Bisbee Kimball, Greenwich, Conn., assignor to Sinclair Refining Company, New York, N. Y., a corporation of Maine Application April 19, 1947, Serial No. 742,605

4 Claims. (Cl. 196—52)

This invention relates to the pyrolytic conversion of hydrocarbons and, more particularly, to pyrolytic conversion processes involving the use of a finely divided catalyst.

The invention is especially applicable to conversion processes of the general type wherein a finely divided catalyst, at elevated temperature, is suspended in the charge oil passing to a reactor in which conversion of the oil occurs and in which spent catalyst is separated from the oil vapors, the separated catalyst stripped of oil, regenerated by the burning-off of the coke or carbon deposited thereon during the reaction and the regenerated catalyst again suspended in the stream of charge oil passing to the reactor. Operations of the type described are commonly designated fluid catalyst processes.

In conventional operations, as just noted, the spent catalyst is passed from the reaction zone, stripped of oil and regenerated. Regeneration is usually effected in a large vertically elongated chamber in which the catalyst in a fluidized state is blown with air, while at an elevated temperature, resulting in the burning from the catalyst of the carbonaceous deposit.

The catalyst is ordinarily conveyed from the reactor, or from the stripping zone, to the regenerator in suspension in air, the suspension entering the regenerator at its lower end, products of combustion being withdrawn from the upper end of the regenerator.

There is maintained in the regenerator a relatively thick bed of the catalyst as a, so-called, "high density" or "dense phase" fluidized body through which the regenerating air passes and which is kept in a general state of turbulence by the rising air and combustion gases.

A very considerable amount of heat is liberated by the combustion of the carbonaceous deposit and in order to avoid overheating the catalyst, it has been proposed to withdraw continuously from the regenerating zone a portion of the hot catalyst which is then cooled, usually by passing through a waste heat boiler, and returned to the regenerator.

A difficulty previously experienced in operations of this type, has been the return to the reaction zone of catalyst which has been only partially regenerated and also the retention in the regenerating zone of catalyst after it has been completely regenerated. These effects have materially reduced the efficiency of the operation, catalyst life and over-all catalytic activity.

My present invention provides an improved method of operation of processes of the type described wherein these difficulties heretofore experienced are minimized. The invention also provides an improved apparatus especially adapted to the carrying out of the process.

In accordance with my invention, the regenerating chamber is divided into a plurality of zones delineated by vertically spaced grids, perforated plates, or the like, extending generally horizontally across and substantially coextensive with the interior of the regenerator. The catalyst, suspended in air or other oxidizing gas, is introduced into the lowermost zone and is gradually carried upwardly by the air through the grids into successively higher zones. The catalyst withdrawn from the regenerator for cooling is cooled and returned to a zone of the regenerator lower than that from which it was withdrawn. The perforated partitions, or grids, serve to minimize the intermixing of catalyst in the various zones, and regenerated catalyst accumulates in the upper zone while partially regenerated catalyst is, for the most part, retained in a lower zone or zones.

In the manner described, the regenerated and partly regenerated catalyst tends to stratify, the completely regenerated catalyst forming an upper strata from which it is withdrawn and returned to the reaction zone.

The invention will be further described and illustrated with reference to the accompanying drawing which represents, conventionally and somewhat diagrammatically, a flow diagram of a fluid catalyst cracking operation embodying my invention.

The apparatus indicated by reference numeral 1 in the accompanying drawing represents a generally cylindrical reactor, of conventional type. The finely divided catalyst suspended in vaporized charge oil enters the reactor through conduit 2 extending into the reactor and terminating in a conical member 3 of somewhat smaller maximum diameter than the reactor and opening upward into the reactor through a conventional grid, not shown.

As the hot oil vapors pass upwardly through the reactor, there is a tendency for the catalyst to drop out of suspension forming a so-called "high density" or "dense phase" fluidized body of catalyst in the reactor, which flows downwardly through the annular space between the member 3 and the walls of the reactor.

Oil vapors, products of the conversion, rise to the top of the reactor, pass through a cyclone type separator 4 to remove suspended catalyst from the vapors, the latter passing therefrom through conduit 5 to fractionating apparatus, not shown, and the separated catalyst is returned to the dense body of catalyst in the reactor.

Spent catalyst flows from the bottom of the reactor into stripper 6 and passes downwardly through the stripper countercurrent to steam, or other gaseous stripping medium, introduced into the lower end of the stripper through line 7. The steam and stripped hydrocarbons pass upwardly from the stripper into the reaction zone. Stripped catalyst passes from the stripper through conduit 8, in which there is interposed a conventional valve arrangement, indicated at 9, for controlling the flow of the catalyst, advantageously a slide valve. From thence, the spent catalyst flows into conduit 10 where it is picked up by a current of air, or other oxidizing gas, and carried up into the regenerator 11 wherein the, so-called, carbon or coke deposited on the spent catalyst is burned off by the air entering through conduit 10.

The conduit 10 leads into the regenerator through the cone-shaped element 12 forming the bottom portion of the regenerator, above which there is a grid 13 and which together form a lower zone of the regenerator. Further up in the regenerator there is a second grid 14 which, similar to grid 13, extends entirely across the regenerator chamber and divides the chamber into a high zone and an intermediate zone.

In operation, catalyst is withdrawn from the intermediate zone through conduit 15, passed through the cooler 16 and returned to the lower zone of the regenerator through conduit 17. The regenerator is further provided with conduit 18 through which hot catalyst is withdrawn from the upper zone of the regenerator and passed to cooler 19, from which the catalyst is returned to the intermediate zone through conduit 20. Conventional means not shown in the drawing may be provided for conveying the catalyst through the conduits and coolers and back to the regenerator; for instance, the catalyst may be so conveyed by a current of air, or other gaseous medium.

The coolers 16 and 19 are, with advantage, waste heat boilers by which steam is generated for use in stripping the catalyst, or for other desired purposes.

The amount of catalyst withdrawn from the respective zones of the regenerator is so controlled, as by means of valves 21 and 22, and the amount of cooling thereof regulated so as to maintain the catalyst in the respective zones at the desired regeneration temperature.

The more active burning usually occurs in the lower portion of the regenerator and satisfactory operation is usually attained by the use of three zones such as shown. However, a greater number of zones may be employed, each connected, as shown, with separate coolers, or waste heat boilers, or two or more zones, may be connected with a single cooler and a prorated amount of catalyst withdrawn from the respective zones.

During its regeneration, the catalyst gradually works its way upwardly into the upper zone of the regenerator and is withdrawn therefrom through conduit 23, at a rate regulated by the valve 24, and flows into the lower end of conduit 2 where it is picked up by a current of preheated charge oil and carried upwardly into the reactor, as previously described.

Products of combustion rise to the upper end of the regenerator and are withdrawn therefrom through cyclone type separator 25, for the separation of suspended catalyst, from which the flue gas passes through conduit 26 to a stack or precipitator, not shown, and separated catalyst is returned to the dense phase bed of catalyst in the regenerator.

The catalyst employed may be of the type conventionally used in fluid catalyst processes, for instance, a silica-alumina type catalyst in finely divided or powdered form. The reaction conditions may likewise be those conventionally used in operations of this type and, as understood by the art, the optimum temperatures and pressures will depend primarily upon the type of feed stock used, the particular catalyst employed and the reaction desired.

In cracking gas oil, for instance, the reaction temperature may, with advantage, be within the range of 800° to 1,000° F. and the pressure at the top of the reactor within the range of 5 to 25 pounds per square inch. The temperature of the catalyst undergoing regeneration may, with advantage, be maintained within the range of 950° to 1,200° F., heat for the reaction being supplied largely by the hot catalyst passing into the charge oil from the regenerator.

Regardless of the particular types of catalyst employed, the optimum regenerating temperature may be maintained in the respective zones of the regenerator, as herein described. For instance, a higher zone may be maintained at a temperature somewhat higher than that of a lower zone, or vice versa, when so desired, to better control the burning of the catalyst richest in carbonaceous deposit. Also, objectionable mixing of fully regenerated catalyst with catalyst which has been only slightly regenerated, is minimized by preventing so-called top-to-bottom mixing of catalyst in the regenerator. By withdrawing the catalyst from a higher zone, cooling the catalyst and returning it to the next lower zone of the regenerator, as herein described, fully regenerated catalyst is segregated in the upper zone and return of partially regenerated catalyst to the reactor is minimized and the over-all efficiency of the catalytic conversion of the hydrocarbons materially improved.

It will be understood that the invention is not restricted to the particular embodiment thereof, herein described, but is applicable to various modifications of fluid catalyst processes in which the catalyst in finely divided form is intermittently regenerated by the burning off of carbonaceous deposits and the regenerated catalyst returned to the zone of hydrocarbon conversion.

I claim:

1. In the fluid catalyst process for the conversion of hydrocarbons wherein a finely divided catalyst at an elevated temperature is repeatedly brought into intimate contact with hydrocarbon vapors to be converted in a conversion chamber, spent catalyst is withdrawn from the conversion zone, stripped of readily vaporizable hydrocarbons, the stripped catalyst conveyed in fluid suspension to a regenerating chamber in which the catalyst in a dense phase fluidized body is regenerated by the burning off of carbon deposits formed thereon during the conversion by the passage of an oxidizing gas in contact therewith and from which catalyst is withdrawn and returned to the conversion chamber, the improvement in the regeneration of the catalyst which comprises passing the spent catalyst in suspension in the oxidizing gas into the lowermost zone of a regenerating chamber comprising at least three zones delineated by vertically spaced, horizontally positioned, perforated partitions, withdrawing catalyst from each zone except the lowermost zone, cooling the withdrawn catalyst and returning it to the respective zones of the regenerating chamber just below that from which it was withdrawn and withdrawing catalyst for return to the conversion chamber from the uppermost zone of the regenerating chamber.

2. In the fluid catalyst process for the conversion of hydrocarbons wherein a finely divided catalyst at an elevated temperature is repeatedly brought into intimate contact in a conversion zone with hydrocarbon vapors to be converted, spent catalyst is withdrawn from the conversion zone, stripped of readily vaporizable hydrocarbons, the stripped catalyst conveyed in fluid suspension to a vertically elongated regenerating chamber comprising a plurality of zones in which the catalyst in dense phase is regenerated by the burning off of carbon deposits formed thereon during the conversion by the passage of an oxidizing gas in contact therewith, and from which catalyst is withdrawn and returned to the conversion zone, the improvement which comprises passing the spent catalyst in suspension in the oxidizing gas into the lowermost zone of a regenerating chamber comprising at least three vertically spaced zones causing the catalyst to be carried gradually upwardly during the regeneration from the lowermost zone to successively higher zones in suspension in the oxidizing gas and products of combustion, withdrawing catalyst from a plurality of zones other than the lowermost zone, cooling the withdrawn catalyst and returning it to the respective zones of the regenerating chamber just below that from which it was withdrawn and withdrawing catalyst for return to the conversion chamber from the uppermost zone of the regenerating chamber.

3. Apparatus especially adapted to the fluid catalyst conversion of hydrocarbons which comprises a vertically elongated reaction chamber, a vertically elongated regenerating chamber, each chamber being adapted to hold a bed of fluidized catalyst, vertically spaced perforated partitions horizontally positioned in the regenerating chamber, dividing said chamber into at least three zones, cooling means, a conduit leading from an intermediate zone of the regenerating chamber to the cooling means, a conduit leading from the cooling means to the next lower zone of the regenerating chamber, a conduit adapted to the passage of catalyst in fluid suspension to the reaction chamber, conveying means adapted to the passage of fluidized catalyst from the reaction zone to the lowermost zone of the regenerating chamber, a conduit leading from the uppermost zone of the regenerating chamber and adapted to conveying catalyst therefrom into the conduit leading to the reaction chamber.

4. Apparatus especially adapted to the fluid catalyst conversion of hydrocarbons which comprises a vertically elongated reaction chamber, a vertically elongated regenerating chamber, each chamber being adapted to hold a bed of fluidized catalyst, vertically spaced perforated partitions horizontally positioned in the regenerating chamber, dividing said chamber into at least three zones, cooling means, a conduit leading from an intermediate zone of the regenerating chamber to the cooling means, a conduit leading from the cooling means to the next lower zone of the regenerating chamber, a second cooling means, a conduit leading from the uppermost zone of the regenerating chamber to said cooling means, a conduit leading from the cooling means to an intermediate zone of the regenerating chamber, a conduit adapted to the passage of catalyst in fluid suspension to the reaction chamber, conveying means adapted to the passage of fluidized catalyst from the reaction chamber to the lowermost zone of the regenerating chamber, a conduit leading from the uppermost zone of the regenerating chamber and adapted to conveying catalyst therefrom into the conduit leading to the reaction chamber.

THOMAS BISBEE KIMBALL.

REFERENCES CITED

The following references are of record in the file of this patent:

UNITED STATES PATENTS

| Number | Name | Date |
| --- | --- | --- |
| 2,369,523 | Belchetz | Feb. 13, 1945 |
| 2,394,710 | McAfee | Feb. 12, 1946 |
| 2,409,234 | Arveson | Oct. 15, 1946 |
| 2,425,098 | Kassel | Aug. 5, 1947 |

FOREIGN PATENTS

| Number | Country | Date |
| --- | --- | --- |
| 574,892 | Great Britain | Jan. 24, 1946 |

OTHER REFERENCES

Walter "Journal of the Institute of Petroleum," vol. 32, No. 270, pages 295–303, June, 1946.